United States Patent
Futamura et al.

(10) Patent No.: US 7,494,442 B2
(45) Date of Patent: Feb. 24, 2009

(54) SHIFT CONTROL DEVICE AND METHOD FOR AUTOMATED MANUAL TRANSMISSION

(75) Inventors: Makoto Futamura, Kanagawa (JP); Masasumi Kitou, Nagoya (JP)

(73) Assignees: Nissan Motor Co., Ltd., Yokohama-shi (JP); Aichi Machine Industry Co., Ltd., Nagoya-shi (JP)

( * ) Notice: Subject to any disclaimer, the term of this patent is extended or adjusted under 35 U.S.C. 154(b) by 404 days.

(21) Appl. No.: 11/485,458

(22) Filed: Jul. 13, 2006

(65) Prior Publication Data
US 2007/0028708 A1 Feb. 8, 2007

(30) Foreign Application Priority Data
Aug. 3, 2005 (JP) ............................. 2005-225382

(51) Int. Cl.
*F16H 61/26* (2006.01)
(52) U.S. Cl. ..................... 477/158; 477/160; 477/163; 477/164
(58) Field of Classification Search ................ 477/156, 477/158, 160, 163, 164
See application file for complete search history.

(56) References Cited

U.S. PATENT DOCUMENTS

| | | | | |
|---|---|---|---|---|
| 5,758,302 A | * | 5/1998 | Schulz et al. ................. | 701/51 |
| 5,846,162 A | * | 12/1998 | Ito et al. ...................... | 477/143 |
| 6,595,898 B2 | * | 7/2003 | Kobayashi et al. ............ | 477/174 |
| 6,997,843 B2 | * | 2/2006 | Saitou ......................... | 475/269 |
| 2004/0149080 A1 | | 8/2004 | Pollak | |
| 2006/0150762 A1 | | 7/2006 | Petrzik | |

FOREIGN PATENT DOCUMENTS

| | | |
|---|---|---|
| EP | 0 802 355 A2 | 10/1997 |
| EP | 1 400 733 A2 | 3/2004 |
| JP | 2004-217204 A | 8/2004 |
| WO | WO 2004/097265 A1 | 11/2004 |

* cited by examiner

*Primary Examiner*—Ha D. Ho
(74) *Attorney, Agent, or Firm*—Foley & Lardner LLP

(57) ABSTRACT

There is provided a shift control device for an automated manual transmission having power transmission lines equipped with respective start clutches and gears. The shift control device includes clutch actuation mechanisms and a transmission shift controller that causes the clutch actuation mechanisms to regulate the clutch engagement forces applied to the start clutches so as to perform clutch changeover upon gear selection for a desired gear range in response to a transmission shift command. Each of the clutch actuation mechanisms has primary and secondary clutch engagement force regulation units. The transmission shift controller outputs a control signal to the primary and secondary clutch engagement force regulation units of each clutch actuation mechanism under the clutch changeover control so that either the primary or secondary clutch engagement force regulation unit of each clutch actuation mechanism operates to regulate a corresponding one of the clutch engagement forces according to the control signal.

10 Claims, 7 Drawing Sheets

SHIFT CONTROL DEVICE AND METHOD FOR AUTOMATED MANUAL TRANSMISSION

BACKGROUND OF THE INVENTION

The present invention relates to a shift control device and method for an automated manual transmission having a plurality of power transmission lines equipped with respective start clutches.

Japanese Laid-Open Patent Publication No. 2004-217204 discloses a twin-clutch manual transmission system that includes a first clutch engaged upon selection of odd-numbered gear ranges and a second clutch engaged upon selection of even-numbered gear ranges and clutch engagement force regulation units such as clutch pressure regulator solenoids to regulate clutch engagement forces and thereby control the engagement states of the first and second clutches, respectively. The transmission system performs, at a command to shift from one odd-numbered gear range (or even-numbered gear range) to any even-numbered gear range (or odd-numbered gear range), so-called clutch changeover control to disengage the first clutch (or second clutch) and engage the second clutch (or first clutch) after the gear selection for the next gear range.

SUMMARY OF THE INVENTION

In the above-disclosed type of transmission system, however, both of the first and second clutches become engaged to provide two parallel power transmission lines and cause double gear meshing (mechanical interlock) under the clutch changeover control e.g. in the event that the first clutch pressure (or second clutch pressure) cannot be reduced due to a failure in the first clutch pressure regulator solenoid (or second clutch pressure regulator solenoid). This results in rapid vehicle deceleration.

It is therefore an object of the present invention to provide an automated manual transmission shift control device and method for preventing rapid vehicle deceleration from occurring due to double gear meshing under clutch changeover control even in the event of a failure in clutch engagement force regulation unit.

According to a first aspect of the invention, there is provided a shift control device for an automated manual transmission in an automotive vehicle, the transmission having a plurality of power transmission lines equipped with respective start clutches and gears, the shift control device comprising: a plurality of clutch actuation mechanisms that regulate clutch engagement forces to selectively engage and disengage the respective start clutches; and a transmission shift controller that causes the clutch actuation mechanisms to regulate the clutch engagement forces, respectively, so as to execute clutch changeover control for engaging one of the start clutches and disengaging any of the start clutches other than the one of the start clutches upon gear selection for a desired gear range in response to a transmission shift command, wherein each of the clutch actuation mechanisms has primary and secondary clutch engagement force regulation units operable independently; and the transmission shift controller outputs a control signal to the primary and secondary clutch engagement force regulation units of each of the clutch actuation mechanisms under the clutch changeover control so that either the primary or secondary clutch engagement force regulation unit of the each of the clutch actuation mechanisms becomes operated to regulate a corresponding one of the clutch engagement forces in accordance with the control signal.

According to a second aspect of the invention, there is provided a shift control method for an automated manual transmission in an automotive vehicle, the transmission having a plurality of power transmission lines equipped with respective start clutches and gears, the shift control method comprising: providing a plurality of clutch actuation mechanisms with primary and secondary clutch engagement force regulation units to regulate clutch engagement forces applied to selectively engage and disengage the respective start clutches; and outputting a control signal to the primary and secondary clutch engagement force regulation units of each of the clutch actuation mechanisms so that either the primary or secondary clutch engagement force regulation unit of the each of the clutch actuation mechanisms becomes operated to regulate a corresponding one of the clutch engagement forces in accordance with the control signal in such a manner as to execute clutch changeover control for engaging one of the start clutches and disengaging any of the start clutches other than said one of the start clutches upon gear selection for a desired gear range in response to a transmission shift command.

According to a third aspect of the invention, there is provided a transmission system for an automotive vehicle, comprising: an automated manual transmission having a plurality of power transmission lines equipped with respective start clutches and gears; a plurality of clutch actuation mechanisms that regulate clutch engagement forces to selectively engage and disengage the respective start clutches; and a transmission shift controller that causes the clutch actuation mechanisms to regulate the clutch engagement forces, respectively, so as to execute clutch changeover control for engaging one of the start clutches and disengaging any of the start clutches other than the one of the start clutches upon gear selection for a desired gear range in response to a transmission shift command, wherein each of the clutch actuation mechanisms has primary and secondary clutch engagement force regulation units operable independently; and the transmission shift controller outputs a control signal to the primary and secondary clutch engagement force regulation units of each of the clutch actuation mechanisms under the clutch changeover control so that either the primary or secondary clutch engagement force regulation unit of the each of the clutch actuation mechanisms becomes operated to regulate a corresponding one of the clutch engagement forces in accordance with the control signal.

The other objects and features of the invention will also be understood from the following description.

DESCRIPTION OF THE EMBODIMENTS

A transmission system for an automotive vehicle according to one embodiment of the invention will be described below in detail with reference to the drawings. In the following description, the terms "front" and "rear" refer to upstream and downstream sides of the direction of power transmission, respectively.

First, the structure of the transmission system will be explained below.

Figure 1:
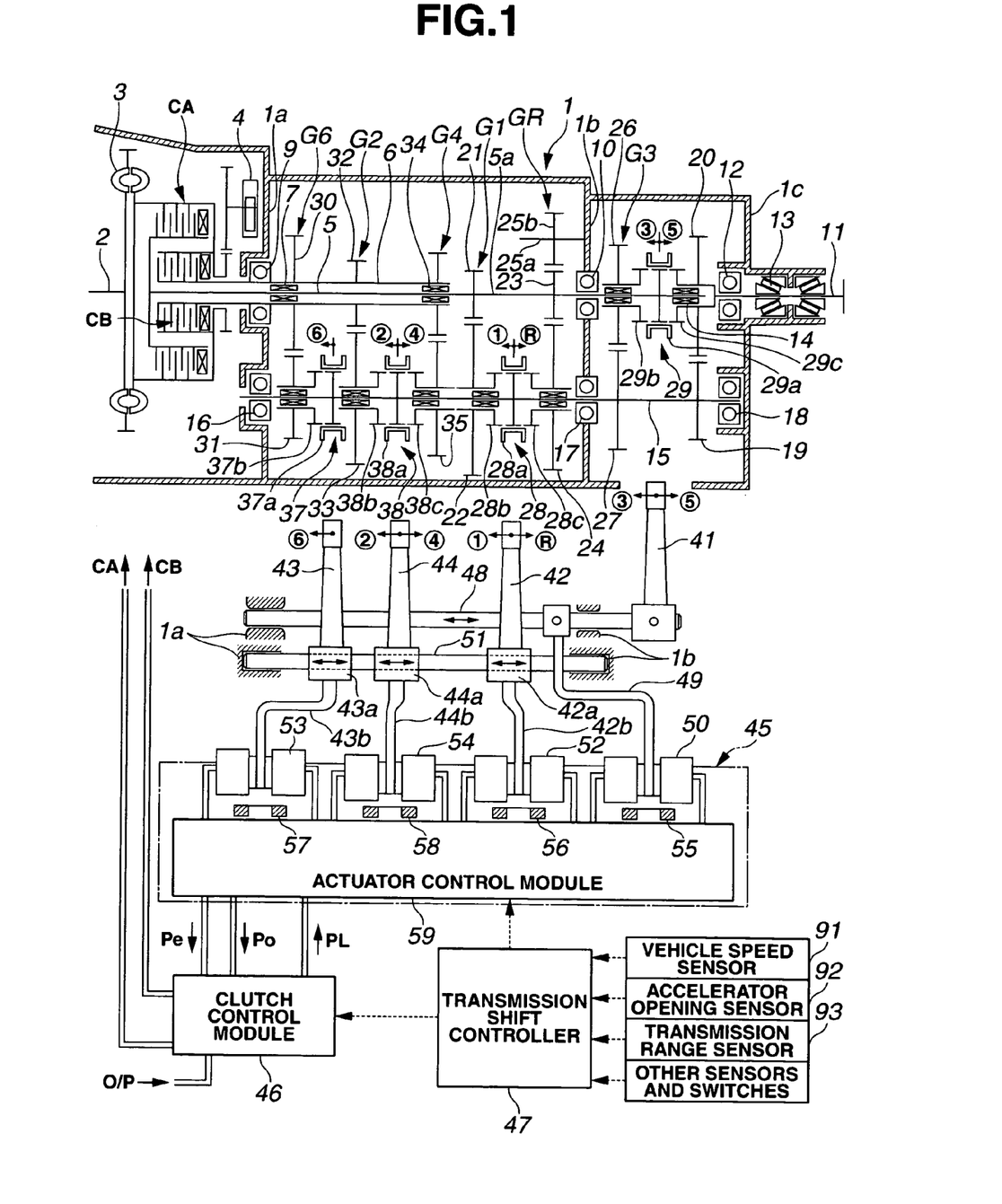
FIG. 1 is a schematic view of a transmission system with an automated manual transmission and a transmission shift control device according to one embodiment of the present invention.

Referring to FIG. 1, the transmission system is provided with an automated manual transmission and a transmission shift control device in the present embodiment.

The automated manual transmission is designed as a twin-clutch transmission that can be switched between a manual shift mode and an automatic shift mode at the request of a vehicle driver and has transmission case 1, engine power shaft 2, first and second clutches CA and CB (as start clutches), torsional damper 3, oil pump 4, first and second input shafts 5 and 6, output shaft 11, counter shaft 15, counter gear 19, output gear 20, reverse idler shaft 25a, gear trains G1 to G4, G6 and GR and gear synchronizers 28, 29, 37 and 38 as shown in FIG. 1.

First and second clutches CA and CB are connected at drive side thereof to engine power shaft 2 via torsional damper 3 and connected at driven side thereof to first and second transmission input shafts 5 and 6, respectively. In the present embodiment, first clutch CA is engaged upon selection of odd-numbered gear ranges (such as a first speed, a third speed, a fifth speed and a reverse speed), so as to provide a drive connection between engine power shaft 2 and first transmission input shaft 5 and thereby input driving power from an vehicle engine to first transmission input shaft 5. By contrast, second clutch CB is engaged upon selection of even-numbered gear ranges (such as a second speed, a fourth speed and a sixth speed), so as to provide a drive connection between engine power shaft 2 and second transmission input shaft 6 and thereby input driving power from the vehicle engine to second transmission input shaft 6 in the present embodiment.

Oil pump 4 is constantly driven by the engine so as to provide a hydraulic pressure supply for clutch engagement and disengagement control and gear selection control.

First transmission input shaft 5 and second transmission input shaft 6 are formed into a solid shape and a hollow shape, respectively. Second transmission input shaft 6 is coaxially and rotatably supported on first transmission input shaft 5 via front and rear needle bearings 7 and 8, with rear portion 5a of first transmission input shaft 5 protruding from a rear end of second transmission input shaft 6. Second transmission input shaft 6 is also rotatably supported on front wall 1a of transmission case 1 via ball bearing 9. Rear portion 5a of first transmission input shaft 5 is passed through middle wall 1b of transmission case 1 and rotatably supported on middle wall 1b of transmission case 1 via ball bearing 10.

Reverse idler shaft 25a is protrudingly mounted on middle wall 1b of transmission case 1.

Transmission output shaft 11 is coaxially aligned to rear portion 5a of first transmission input shaft 5 and rotatably supported on rear wall 11c of transmission case 1 and on rear portion 5a of first transmission input shaft 5 via taper roller bearing 12 and axial bearing 13 and via needle bearing 14, respectively.

Counter shaft 15 is arranged in parallel with first and second transmission input shafts 5 and 6 and transmission output shaft 11 and rotatably supported on front, middle and rear walls 1a, 1b and 1c of transmission case 1 via roller bearings 16, 17 and 18, respectively.

Counter gear 19 is integrally formed on a rear end of counter shaft 15, whereas output gear 20 is mounted on a front end of transmission output shaft 11. Counter gear 19 and output gear 20 are held in mesh with each other to provide a drive connection between counter shaft 15 and power output shaft 11. In the present embodiment, counter gear 19 and output gear 20 form a speed reducing gear train.

Odd-numbered gear trains, i.e., first speed gear train G1, reverse gear train GR and third speed gear train G3 are disposed (in order of mention from front to rear) between rear portion 5a of transmission input shaft 5 and counter shaft 15.

First speed gear train G1 has first speed input gear 21 mounted on rear portion 5a of transmission input shaft 5 and first speed output gear 22 mounted on counter shaft 15 and held in mesh with first speed input gear 21.

Reverse gear train GR has reverse input gear 23 mounted on rear portion 5a of transmission input shaft 5, reverse output gear 24 mounted on counter shaft 15 and idler gear 25b rotatably supported on idler shaft 25a and held in mesh with reverse input gear 23 and reverse output gear 24.

Third speed gear train G3 has third speed input gear 26 mounted on rear portion 5a of transmission input shaft 5 and third speed output gear 27 mounted on counter shaft 15 and held in mesh with third speed input gear 26.

First-reverse (1-R) gear synchronizer 28 is disposed on counter shaft 15 at a location between first speed gear train G1 and reverse gear train GR and equipped with coupling sleeve 28a and clutch gears 28b and 28c. 1-R gear synchronizer 28 drivingly connects first speed output gear 22 to counter shaft 15 so as to allow selection of the first forward speed when coupling sleeve 28a moves from its neutral position (shown in FIG. 1) and makes a spline coupling with clutch gear 28b. When coupling sleeve 28a moves from its neutral position and makes a spline coupling with clutch gear 28c, 1-R gear synchronizer 28 drivingly connects reverse output gear 24 to counter shaft 15 so as to allow selection of the reverse speed.

Third-fifth (3-5) gear synchronizer 29 is disposed on rear portion 5a of transmission input shaft 5 at a location between third speed gear train G3 and output gear 20 and equipped with coupling sleeve 29a and clutch gears 29b and 29c. 3-5 gear synchronizer 29 drivingly connects third speed output gear 26 to transmission input shaft 5 so as to allow selection of the third forward speed when coupling sleeve 29a moves from its neutral position (shown in FIG. 1) and makes a spline coupling with clutch gear 29b. When coupling sleeve 29a moves from its neutral position and makes a spline coupling with clutch gear 29c, 3-5 gear synchronizer 29 directly connects transmission input shaft 5 to output gear 20 so as to allow selection of the fifth forward speed.

Even-numbered gear trains, i.e., sixth speed gear train G6, second speed gear train G2 and fourth speed gear train G4 are disposed (in order of mention from front to rear) between transmission input shaft 6 and counter shaft 15.

Sixth speed gear train G6 has sixth speed input gear 30 mounted on transmission input shaft 6 and sixth speed output gear 31 mounted on counter shaft 15 and held in mesh with sixth speed input gear 30.

Second speed gear train G2 has second speed input gear 32 mounted on transmission input shaft 6 and second speed output gear 33 mounted on counter shaft 15 and held in mesh with second speed input gear 32.

Fourth speed gear train G4 has fourth speed input gear 34 mounted on transmission input shaft 6 and fourth speed output gear 35 mounted on counter shaft 15 and held in mesh with fourth speed input gear 34.

Sixth-neutral (6-N) gear synchronizer 37 is disposed on counter shaft 15 at a location adjacent to sixth speed gear train G6 and equipped with coupling sleeve 37a and clutch gear 37b. When coupling sleeve 37a moves from its neutral position (shown in FIG. 1) and makes a spline coupling with clutch gear 37b, 6-N gear synchronizer 37 drivingly connects sixth speed output gear 31 to counter shaft 15 so as to allow selection of the sixth forward speed.

Second-fourth (2-4) gear synchronizer 38 is disposed on counter shaft 15 at a location between second speed gear train G2 and fourth speed gear train G4 and equipped with coupling sleeve 38a and clutch gears 38b and 38c. 2-4 gear synchronizer 38 drivingly connects second speed output gear 33 to counter shaft 15 so as to allow selection of the second forward speed when coupling sleeve 38a moves from its neutral position (shown in FIG. 1) and makes a spline coupling with clutch gear 38b. When coupling sleeve 38a moves from its neutral position and makes a spline coupling with clutch gear 38c, 2-4 gear synchronizer 38 drivingly connects fourth speed output gear 35 to counter shaft 15 so as to allow selection of the fourth forward speed.

As shown in FIG. 1, the transmission shift control device includes first and second shift rods 48 and 51, third-fifth (3-5) shift fork 41, first-reverse (1-R) shift fork 42, sixth-neutral (6-N) shift fork 43, second-fourth (2-4) shift fork 44, third-fifth (3-5) shift bracket 49, actuator unit 45 with shift actuators 50 and 52 to 54, shift position sensors 55 to 58 and hydraulic actuator control module (circuit) 59, hydraulic clutch control module (circuit) 46 and transmission shift controller 47.

First shift rod 48 is axially slidably mounted on front and middle walls 1a and 1b of transmission case 1, whereas second shift rod 51 is fixedly mounted on front and middle walls 1a and 1b of transmission case 1.

3-5 shift fork 41 is coupled with synchronizer coupling sleeve 29a and fixed to gear shift rod 48. 3-5 shift bracket 49 is fixed to shift rod 48 with an end portion of shift bracket 49 being freely supported on a spool shaft portion of third-fifth (3-5) shift actuator 50. Shift fork 41 is thus actuated in response to the spool motion of shift actuator 50 so as to move synchronizer coupling sleeve 29a from its neutral position to clutch gear 29b (under selection of the third speed) or clutch gear 29c (under selection of the fifth speed).

1-R shift fork 42 is coupled with synchronizer coupling sleeve 28a and provided with bracket cylinder portion 42a and bracket arm portion 42b. Bracket cylinder portion 42a is axially movably supported on shift rod 51, whereas bracket arm portion 42b is formed integrally with bracket cylinder portion 42a and freely supported on a spool shaft portion of first-reverse (1-R) shift actuator 52. Shift fork 42 is thus actuated in response to the spool motion of shift actuator 52 so as to move synchronizer coupling sleeve 28a from its neutral position to clutch gear 28b (under selection of the first speed) or clutch gear 28c (under selection of the reverse speed).

6-N shift fork 43 is coupled with synchronizer coupling sleeve 37a and provided with bracket cylinder portion 43a and bracket arm portion 43b. Bracket cylinder portion 43a is axially movably supported on shift rod 51, whereas bracket arm portion 43b is formed integrally with bracket cylinder portion 43a and freely supported on a spool shaft portion of sixth-neutral (6-N) shift actuator 53. Shift fork 43 is thus actuated in response to the spool motion of shift actuator 53 so as to move synchronizer coupling sleeve 37a from its neutral position to clutch gear 37b (under selection of the sixth speed).

2-4 shift fork 44 is coupled with synchronizer coupling sleeve 38a and provided with bracket cylinder portion 44a and bracket arm portion 44b. Bracket cylinder portion 44a is axially movably supported on shift rod 51, whereas bracket arm portion 44b is formed integrally with bracket cylinder portion 44a and freely supported on a spool shaft portion of second-fourth (2-4) shift actuator 54. Shift fork 44 is thus actuated in response to the spool motion of shift actuator 54 so as to move synchronizer coupling sleeve 38a from its neutral position to clutch gear 38b (under selection of the second speed) or clutch gear 38c (under selection of the fourth speed).

Figure 2:
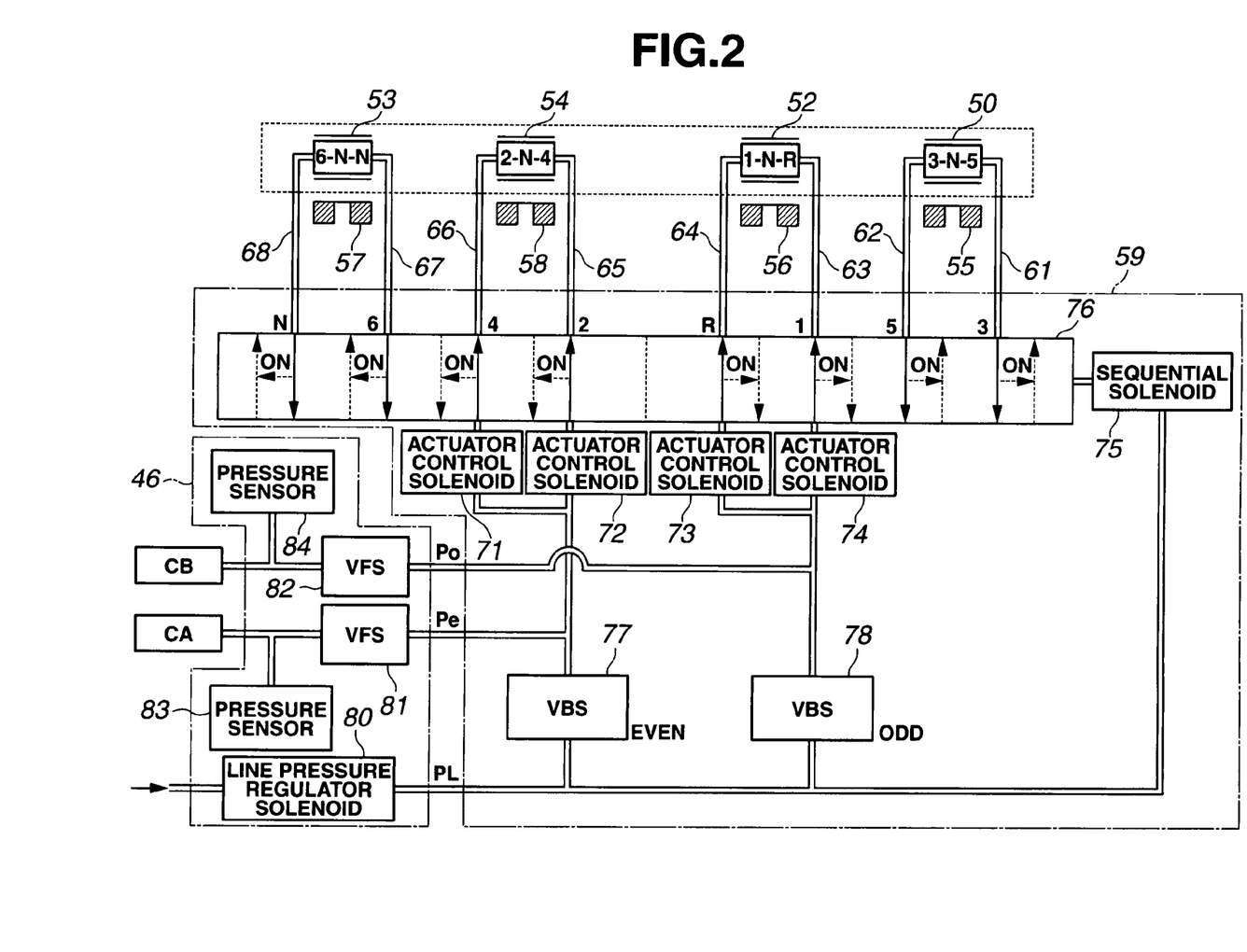
FIG. 2 is a block diagram of hydraulic clutch and shift actuator control modules of the transmission shift control device, when in a low gear range selection state, according to one embodiment of the present invention.
Figure 3:
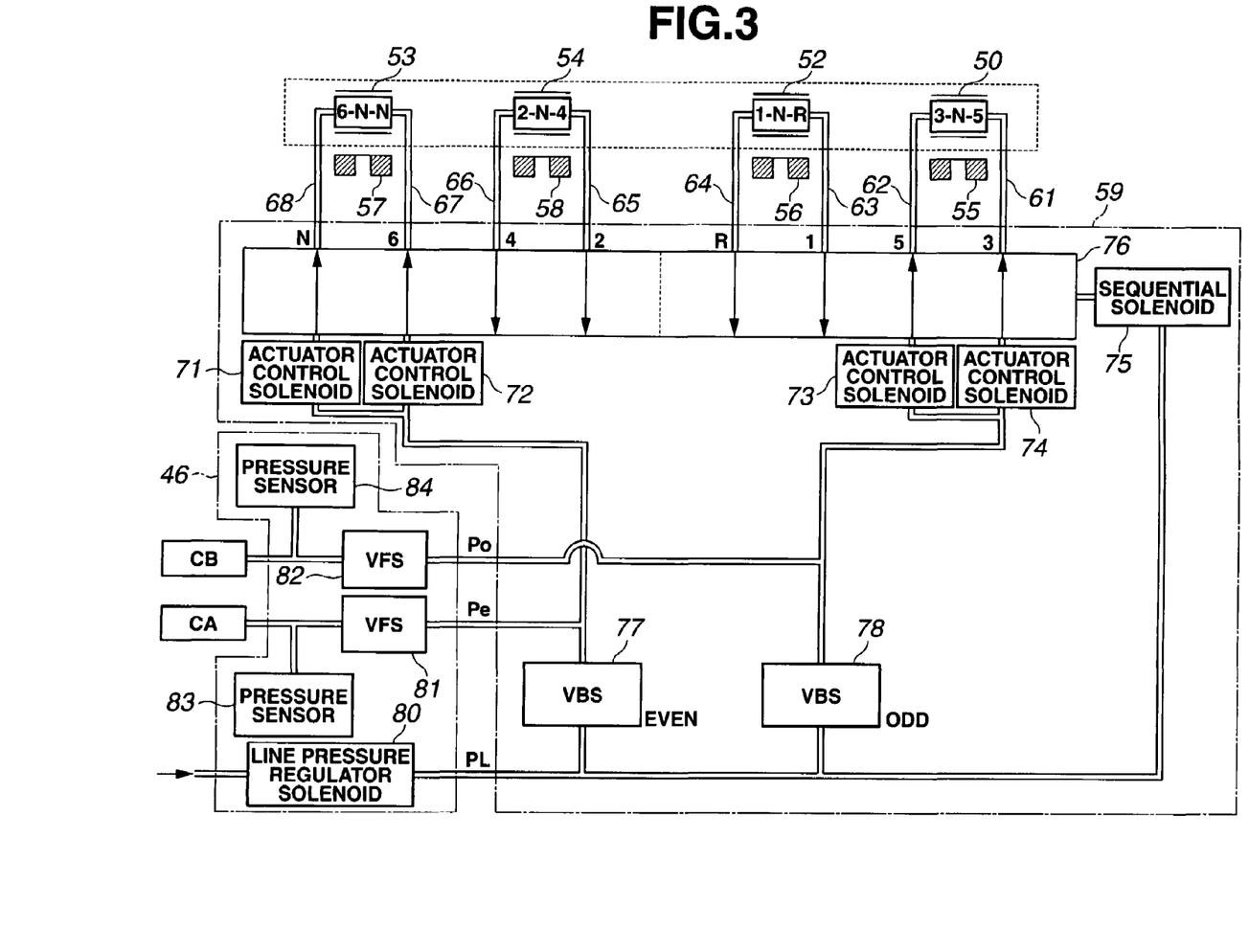
FIG. 3 is a block diagram of hydraulic clutch and shift actuator control modules of the transmission shift control device, when in a high gear range selection state, according to one embodiment of the present invention.

As shown in FIGS. 2 and 3, hydraulic clutch control module 46 has line pressure regulator solenoid 80 and first and second clutch pressure regulator solenoids 81 and 82.

Line pressure regulator solenoid 80 adjusts a hydraulic pressure discharged from oil pump 4 to a line pressure PL of the transmission system. The regulated line pressure PL is fed to actuator control module 59.

First and second clutch pressure regulator solenoids 81 and 82 adjust pressures Pe and Po fed from actuator control module 59 to clutch pressures (as clutch engagement forces) applied to first and second clutches CA and CB, respectively, for clutch engagement and disengagement control. In the present embodiment, each of pressure regulator solenoids 81 and 82 is formed with a variable force solenoid (VFS) structure.

Actuator unit 45 is fixed to an appropriate portion (upper, lower or side portion) of transmission case 1 so that shift actuators 50, 52, 53 and 54 can actuate shift forks 41 to 44, respectively, under the control of hydraulic actuator control module 59.

As shown in FIGS. 2 and 3, hydraulic actuator control module 59 includes actuator control solenoids 71 to 74, sequential solenoid 75 and even-number and odd-number speed source pressure regulator solenoids 77 and 78.

Even-number and odd-number speed source pressure regulator solenoids 77 and 78 adjust the line pressure PL fed from line pressure regulator solenoid 80 to the even-number and odd-number speed source pressures Pe and Po (as first and second source pressures), respectively. The regulated even-number speed source pressure Pe is fed to actuator control solenoids 71 and 72 and first clutch pressure regulator solenoid 81, whereas the regulated odd-number speed source pressure Po is fed to actuator control solenoids 73 and 74 and second clutch pressure regulator solenoid 82. In the present invention, each of pressure regulator solenoids 77 and 78 is formed with a variable bleed solenoid (VBS) structure.

Actuator control solenoids 71 to 74 and sequential solenoid 75 are arranged so as to selectively open and close eight hydraulic pressure lines, i.e., third-speed pressure line 61, fifth-speed pressure line 62, first-speed pressure line 63, reverse-speed pressure line 64, second-speed pressure line 65, fourth-speed pressure line 67 and sixth-speed pressure line 68, and thereby supply a regulated amount of hydraulic operating pressure to shift actuator 50, 52, 53, 54 depending on the selected gear range. In the present embodiment, actuator control solenoids 71 and 72 generate and regulate the hydraulic operating pressure of shift actuator 53, 54 from the source pressure Pe under selection of the even-numbered gear ranges. On the other hand, actuator control solenoids 73 and 74 generate and regulate the hydraulic operating pressure of shift actuator 50, 52 from the source pressure Po under selection of the odd-numbered gear ranges in the present embodiment.

Sequential solenoid 75 has spool 76 operated to allow selection of the lower gear range (first speed, second speed, fourth speed, reverse speed) in the OFF position as shown in FIG. 2 and to allow gear selection for the higher gear range (third speed, fifth speed, sixth speed) in the ON position as shown in FIG. 3.

Referring again to FIG. 1, the transmission system also includes various detection units such as vehicle speed sensor 91 to detect a traveling speed V of the vehicle, accelerator opening sensor 92 to detect an accelerator opening of the vehicle and transmission range sensor 93 to detect an operation range of the vehicle transmission. In actuator unit 45, shift position sensors 55 to 58 are disposed adjacent to shift actuators 50 and 52 to 54 so as to monitor the spool motions of shift actuators 50 and 52 to 54 and detect the actual speed range of the transmission. Further, pressure sensors 83 and 84 are provided in clutch control module 46 to detect the first and second clutch control pressures, respectively, as shown in FIGS. 2 and 3. The above detected operation parameters are inputted into transmission shift controller 47.

Transmission shift controller 47 has a shift control section (means) that generates and outputs various control signals such as gear selection signals (e.g. even-number and odd-number speed source pressure regulation signals) and clutch engagement and disengagement signals (e.g. a line pressure regulation signal and clutch pressure regulation signals) based on the detected operation parameters, and then, drives actuator control module 59 and clutch control module 46 under these control signals so as to control the shift operations of the transmission system.

In the present embodiment, the shift control section (means) transmission shift controller 47 executes clutch changeover control to engage first clutch CA and disengage second clutch CB or to disengage first clutch CA and engage second clutch CB after the gear selection for the next gear range in accordance with the transmission upshift or downshift command.

The shift operations of the transmission system will be next explained below.

When the transmission is in neutral (N range) or park (P range), both of first and second clutches CA and CB are disengaged and all of shift actuators 50 and 52 to 54 are placed in their respective neutral positions (i.e. synchronizer coupling sleeves 28a, 29a, 37a and 38a are maintained at their respective positions). In this state, no power is transmitted by the manual transmission.

When the transmission is in the manual shift mode or in D range or R range under the automatic shift mode (where power transmission is required), the transmission shift operations are basically carried out in the following manner.

For shifting to the first speed, shift actuator 52 is activated to move shift fork 42 such that synchronizer coupling sleeve 28a meshes with clutch gear 28b to provide a drive connection between first speed output gear 22 and counter shaft 15. First clutch CA is subsequently engaged. With this, the first forward speed is established by power transmission from first clutch CA to transmission output shaft 11 through first transmission input shaft 5, first speed gear train G1, counter shaft 15 and output gear train 19, 20.

For upshifting from the first speed to the second speed, shift actuator 54 is first activated to move shift fork 44 such that synchronizer coupling sleeve 38a meshes with clutch gear 38b to provide a drive connection between second speed output gear 33 and counter shaft 15. Subsequently, clutch changeover is performed to disengage first clutch CA and engage second clutch CB. The second forward speed is then established by power transmission from second clutch CB to transmission output shaft 11 through second transmission input shaft 6, second speed gear train G2, counter shaft 15 and output gear train 19, 20.

For upshifting from the second speed to the third speed, shift actuator 50 is first activated to move shift fork 41 such that synchronizer coupling sleeve 29a meshes with clutch gear 29b to provide a drive connection between third speed input gear 26 and first transmission input shaft 5. Clutch changeover is subsequently performed to engage first clutch CA and disengage second clutch CB. The third forward speed is then established by power transmission from first clutch CA to transmission output shaft 11 through first transmission input shaft 5, third speed gear train G3, counter shaft 15 and output gear train 19, 20.

For upshifting from the third speed to the fourth speed, shift actuator 54 is first activated to move shift fork 44 such that synchronizer coupling sleeve 38a meshes with clutch gear 38c to provide a drive connection between fourth speed output gear 35 and counter shaft 15. Clutch changeover is subsequently performed to disengage first clutch CA and engage second clutch CB. The fourth forward speed is then established by power transmission from second clutch CB to transmission output shaft 11 through second transmission input shaft 6, fourth speed gear train G4, counter shaft 15 and output gear train 19, 20.

For upshifting from the fourth speed to the fifth speed, shift actuator 50 is first activated to move shift fork 41 such that synchronizer coupling sleeve 29a meshes with clutch gear 29c to provide a direct connection between first transmission input shaft 5 and transmission output shaft 11. Subsequently, clutch changeover is performed to engage first clutch CA and disengage second clutch CB. The fifth forward speed (having a speed change ratio of 1) is then established by power transmission from first clutch CA to transmission output shaft 11 through first transmission input shaft 5.

For upshifting from the fifth speed to the sixth speed, shift actuator 53 is first activated to move shift fork 43 such that synchronizer coupling sleeve 37a meshes with clutch gear 37b to provide a drive connection between sixth speed output gear 31 and counter shaft 15. Clutch changeover is subsequently performed to disengage first clutch CA and engage second clutch CB. The sixth forward speed is then established by power transmission from second clutch CB to transmission output shaft 11 through second transmission input shaft 6, sixth speed gear train G6, counter shaft 15 and output gear train 19, 20.

For downshifting from the sixth speed to the fifth speed, to the fourth speed, to the third speed, to the second speed and then to the first speed, the above transmission shift operations are followed in reverse.

Upon selection of the reverse drive range, shift actuator 51 is activated to move shift fork 42 such that synchronizer coupling sleeve 28a meshes with clutch gear 28c to provide a drive connection between reverse output gear 24 and counter shaft 15. First clutch CA is subsequently engaged. Then, the reverse speed is established by power transmission form first clutch CA to transmission output shaft 11 through first transmission input shaft 5, reverse gear train GR, counter shaft 15 and output gear train 19, 20.

Herein, there is a possibility that a failure may occur in a clutch engagement force regulation unit of the transmission system.

Figure 6A:
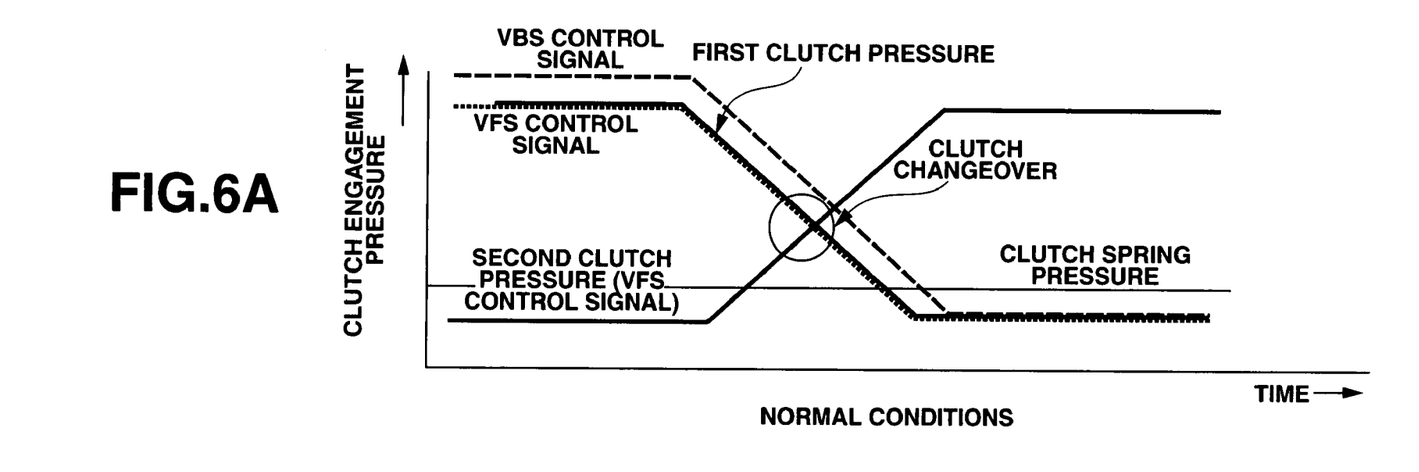
FIGS. 6A and 6B are time charts of clutch changeover control under normal and fault conditions according to one embodiment of the present invention.
Figure 6B:
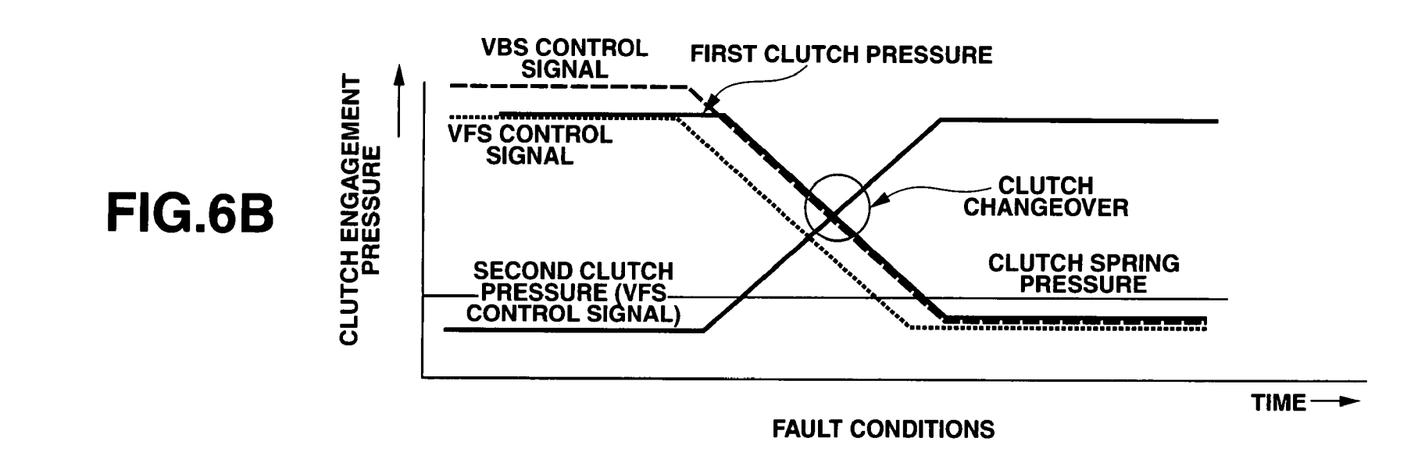
Figure 7A:
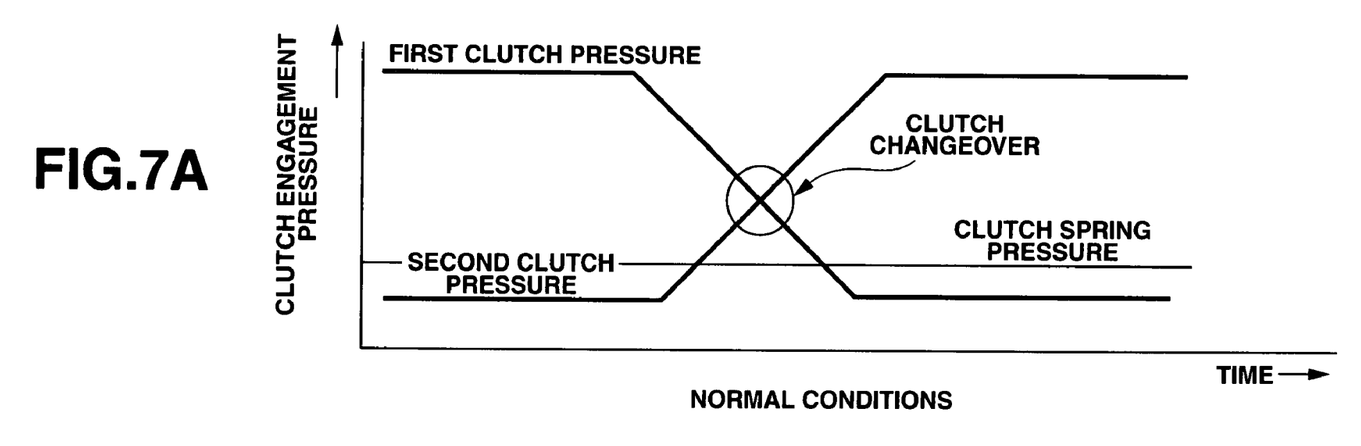
FIGS. 7A and 7B are time charts of clutch changeover control under normal and fault conditions according to the earlier technology.
Figure 7B:
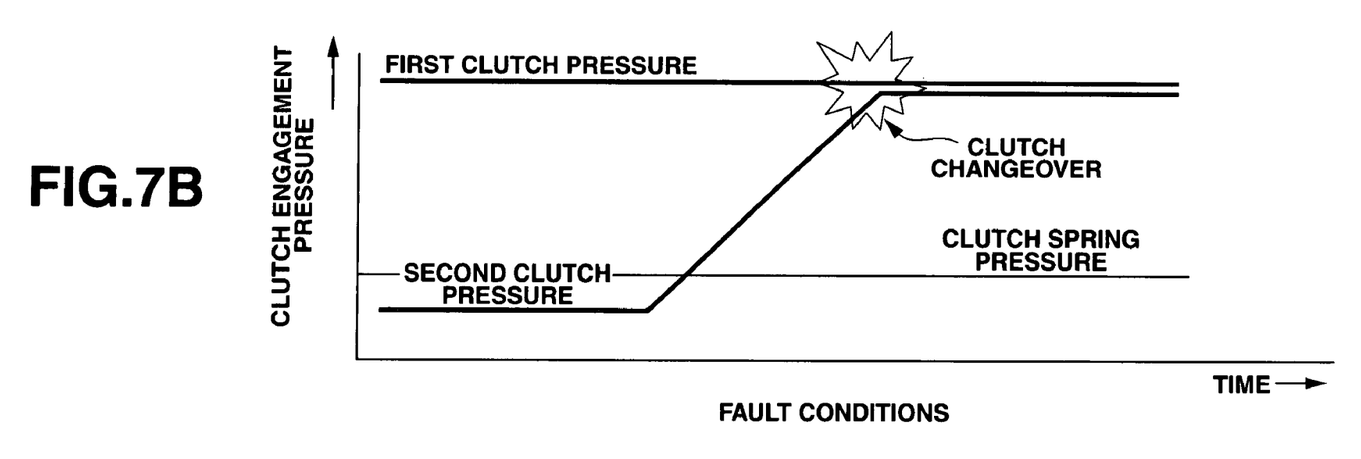

The clutch changeover control of the earlier technology is executed to disengage first clutch CA' and engage second clutch CB' as shown in FIG. 6A under normal conditions after the gear selection for the next gear range. However, both of first and second clutches CA' and CB' are engaged to provide two power transmission lines and cause double gear meshing (mechanical interlock) under the clutch changeover control of the earlier technology as shown in FIG. 6B in the event that first clutch control pressure cannot be reduced due to a failure in first clutch pressure regulator solenoid. This results in rapid vehicle deceleration.

In order to prevent the occurrence of rapid vehicle deceleration due to double gear meshing, it is conceivable to monitor first and second clutch pressures with pressure sensors for detection of a failure in clutch pressure regulator solenoid, and then, perform feedback control upon detection of any failure in clutch pressure regulator solenoid. Software data backup is however susceptible to various factors such as input, CPU manipulation and output processing and hydraulic pressure response delay. For this reason, the clutch pressure feedback control becomes late for quick transmission shift operations so that the vehicle will unavoidably experiences a deceleration G.

Transmission shift controller 47 is accordingly configured to output the first clutch pressure regulation signal to each of pressure regulator solenoids 77 and 81, output the second clutch pressure regulation signal to each of pressure regulator solenoids 78 and 82 and control the first and second clutch pressures using either one of pressure regulator solenoids 81 and 77 and either one of pressure regulator solenoids 82 and 78, respectively, under the clutch changeover control in the present embodiment. Namely, pressure regulator solenoids 77 and 81 form a duplexed (redundant) clutch actuation mechanisms in which pressure regulator solenoids 81 and 77 function as primary and secondary clutch engagement force regulation units operable independently to control the engagement and disengagement of first clutch CA. Pressure regulator solenoids 78 and 82 also form a duplexed (redundant) clutch actuation mechanism in which pressure regulator solenoids 82 and 78 function as primary and secondary clutch engagement force regulation units operable independently to control the engagement and disengagement of second clutch CB.

When first and second clutch pressure regulator solenoids 81 and 82 function normally, the first and second clutch pressures are regulated by means of these pressure regulator solenoids 81 and 82 according to the first and second clutch pressure regulation signals, respectively, so that the clutch changeover occurs at a point of intersection of the signal to pressure regulator solenoid 81 (VFS control signal) and the signal to pressure regulator solenoid 82 (VFS control signal) as shown in FIG. 6A.

Figure 5:
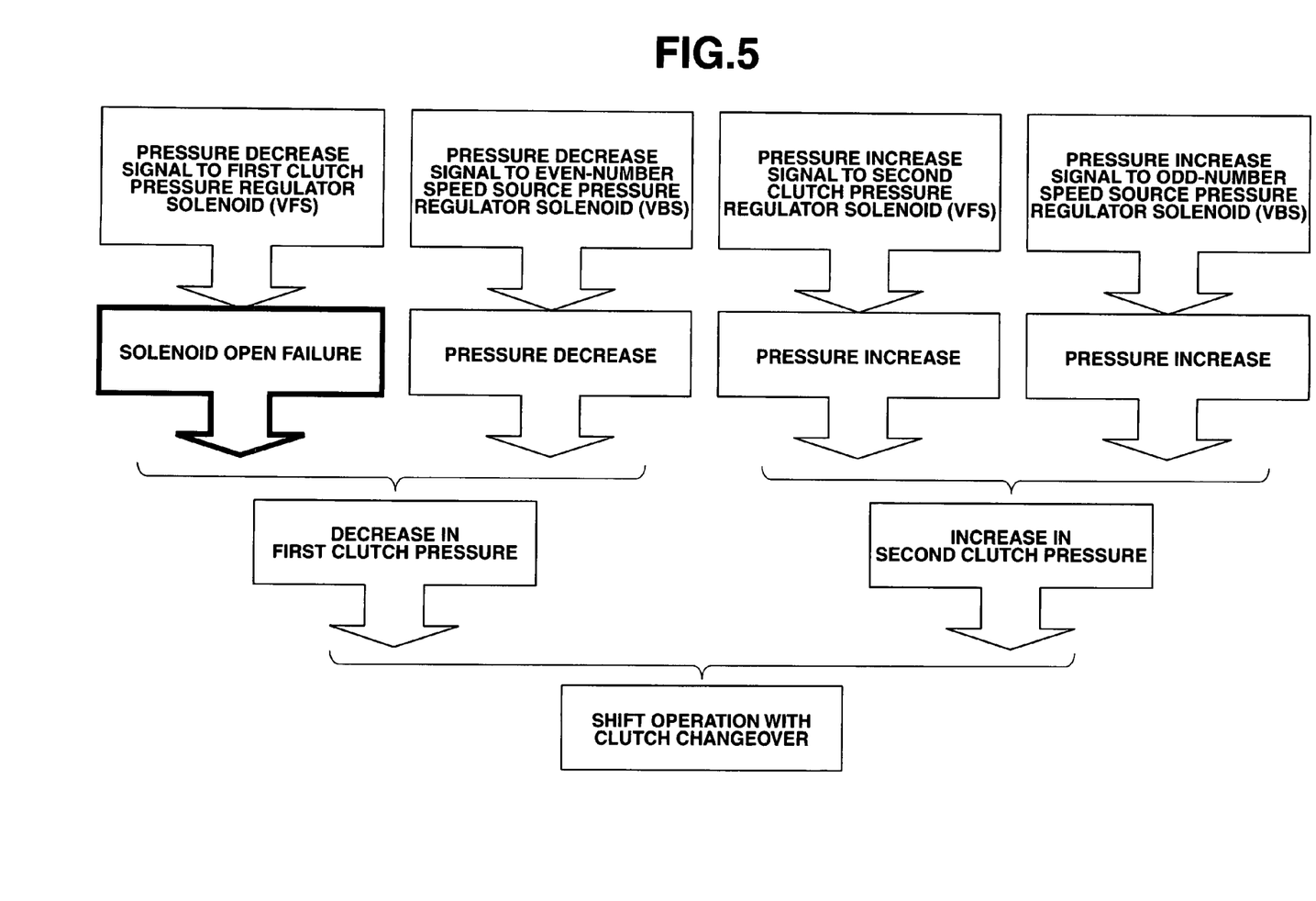
FIG. 5 is a sequence diagram of clutch changeover control under fault conditions according to one embodiment of the present invention.

In the event of a solenoid open failure in first clutch pressure regulator solenoid 81, pressure regulator solenoid 77 is opened. In the event of a solenoid close failure in first clutch pressure regulator solenoid 81, by contrast, pressure regulator solenoid 77 is closed. In other words, the first and second clutch pressures are regulated by means of pressure regulator solenoids 77 and 82 according to the first and second clutch pressure regulation signals, respectively, so that the clutch changeover occurs at a point of intersection of the control signal to pressure regulator solenoid 77 (VBS control signal) and the control signal to pressure regulator solenoid 82 (VFS control signal), as shown in FIGS. 5 and 6B, in the event of a failure in first clutch pressure regulator solenoid 81.

Similarly, the first and second clutch control pressures are regulated by means of pressure regulator solenoids 81 and 78 according to the first and second clutch pressure regulation signals in the event of a failure in second clutch pressure regulator solenoid 82.

In this way, the operations of the transmission system can be secured by the even-numbered gear drive mechanism (even-number speed source pressure regulator solenoids 77, second clutch pressure regulator solenoid 82) in the event that a failure occurs only in first clutch pressure regulator solenoid 81 and secured by the odd-numbered gear drive mechanism (odd-number speed source pressure regulator solenoids 78, first clutch pressure regulator solenoid 81) in the event that a failure occurs only in second clutch pressure regulator solenoid 82.

In the event of a failure in each of first and second clutch pressure regulator solenoids 81 and 82, the first and second clutch control pressures are regulated by means of pressure regulator solenoids 77 and 78 according to the first and second clutch pressure regulation signals, respectively, so as to secure the operations of the transmission system by proper clutch changeover.

In the present embodiment, pressure regulator solenoid 77, 78 performs two functions: even- or odd-number speed source pressure control function and clutch pressure control function as explained above. This makes it possible to reduce the number of solenoid valves in hydraulic control modules 46 and 59. The operation performance of the transmission system is however largely affected by the frequent use of pressure regulator solenoid 77, 78 in clutch pressure control.

The duplex clutch actuation solenoid mechanisms are thus developed only in the case that deceleration G exceeds an acceptable level regardless of the occurrence or nonoccurrence of a failure in clutch pressure regulator solenoid 81, 82 in the present embodiment.

The deceleration G often exceeds the acceptable level during the transmission shift operations under the condition: (1) the transmission is in the manual shift mode (where there is no limitation on engine speed ranges); (2) the transmission shifts from the first speed to the second speed; (3) the engine revolution speed is higher than or equal to 6000 rpm (when the vehicle traveling speed is lower than or equal to a given speed value Vo); and (4) the vehicle is coasting under no accelerator operation. In the present embodiment, the first and second clutch pressures are regulated by means of the duplex solenoid mechanisms, respectively, upon satisfaction of all of the above-specific criteria (1) to (4). At the other time e.g. when the transmission is in the automatic shift mode, the first and second clutch pressures are regulated based on a transmission shift map in such a manner as to avoid the above shift range of the transmission shift map and thereby prevent the occurrence of the deceleration G.

It should be noted that the failure management condition of the clutch changeover control is not limited to the above and may be modified (eased) as appropriate. The first and second clutch pressures may be alternatively regulated by means of the respective duplex solenoid mechanisms under the condition that the transmission is placed in the manual shift mode, that the vehicle is in a low speed range (the vehicle traveling speed V is lower than or equal to the threshold value Vo) during the upshift from the first speed to the second speed, or that the vehicle is in a coasting state under no accelerator operation during the upshift from the first speed to the second speed. This also makes it possible to prevent double gear meshing and rapid vehicle deceleration effectively.

Figure 4:
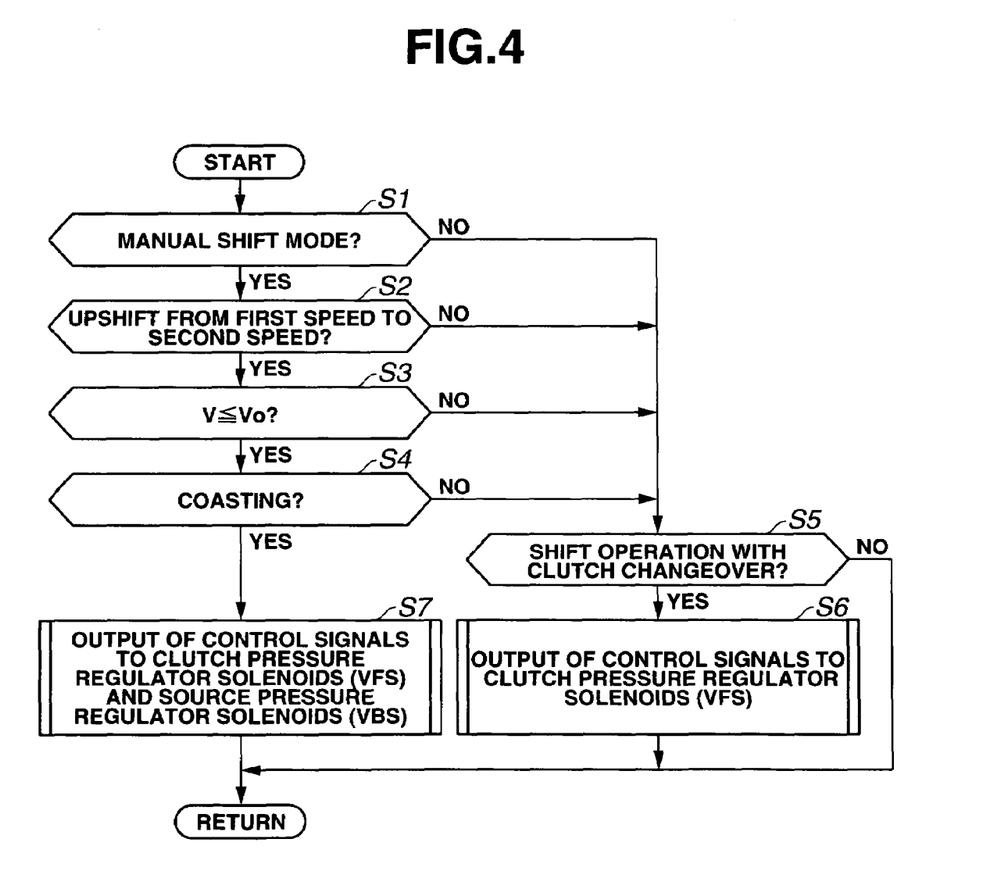
FIG. 4 is a flowchart for a shift control (clutch changeover control) program of the transmission shift control device according to one embodiment of the present invention.

The control process of transmission shift controller 47 will be now explained below in detail with reference to FIG. 4.

At step S1, transmission shift controller 47 judges whether the manual shift mode has been selected by the vehicle driver. When the transmission is in the manual shift mode (Yes at step S1), control goes to step S2. When the transmission is in D range (or R range) under the automatic shift mode (No at step S2), control goes to step S5.

At step S2, transmission shift controller 47 determines whether the transmission is commanded to shift from the first speed to second speed. If Yes at step S2, control goes to step S3. If No at step S2, control goes to step S5.

At step S3, transmission shift controller 47 checks whether the vehicle is in a low traveling speed range. If the vehicle traveling speed V is lower than or equal to the given threshold value Vo (Yes at step S3), control goes to step S4. If the vehicle traveling speed V is higher than the threshold value Vo (No at step S3), control goes to step S5. Transmission shift controller 47 may alternatively checks whether the engine revolution speed is higher than or equal to a given threshold value in this step.

At step S4, transmission shift controller 47 judges whether the vehicle is coasting under no accelerator operation. If Yes at step S4, control goes to step S7. If No at step S4, control goes to step S5.

At step S5, transmission shift controller 47 determines whether the transmission is commanded to shift up or down with clutch changeover. If Yes at step S5, control goes to step S6. If No at step S5, control returns to the top of the loop.

At step S6, transmission shift controller 47 executes clutch changeover control in a normal mode, i.e., outputs the first clutch pressure regulation signal (pressure decrease signal) to pressure regulator solenoid 81 and outputs the second clutch pressure regulation signal (pressure increase signal) to pressure regulator solenoid 82 such that pressure regulator solenoids 81 and 82 regulate the first and second clutch pressures according to the first and second clutch pressure regulation signals, respectively, so as to disengage first clutch CA and engage second clutch CB. Control then returns to the top of the loop.

At step S7, transmission shift controller 47 executes clutch changeover control in a failure management mode, i.e., outputs the first clutch pressure regulation signal (pressure decrease signal) to each of pressure regulator solenoids 77 and 81 and outputs the second clutch pressure regulation signal (pressure increase signal) to each of pressure regulator solenoids 78 and 82 such that pressure regulator solenoids 77 or 81 and pressure regulator solenoids 78 or 82 regulate the first and second clutch pressures according to first and second clutch pressure regulation signals, respectively, so as to disengage first clutch CA and engage second clutch CB. Control then returns to the top of the loop.

With the above-described configuration, it is therefore possible in the event of either one of pressure regulator solenoids 77 and 81 and either one of pressure regulator solenoids 78 and 82 to perform proper clutch changeover operation through the use of the other of pressure regulator solenoids 77 and 81 and the other of pressure and prevent rapid vehicle deceleration from occurring due to double gear meshing during the clutch changeover operation.

The entire contents of Japanese Patent Application No. 2005-225382 (filed on Aug. 3, 2005) are herein incorporated by reference.

Although the present invention has been described with reference to a specific embodiment of the invention, the invention is not limited to the above-described embodiment. Various modification and variation of the embodiment described above will occur to those skilled in the art in light of the above teaching.

In the above embodiment, hydraulic solenoids 81 and 82 are used as the primary clutch engagement force regulation units. The clutch engagement force regulation units are not however limited to the hydraulic solenoid valves. For example when first and second start clutches CA and CB are designed as solenoid clutches, solenoid current control circuits can alternatively be used as the clutch engagement force regulation units.

Further, additional separate pressure regulator solenoids may alternatively be provided as the secondary clutch engagement force regulation units although even-number and odd-number speed source pressure control solenoids 77 and 78 are used as the secondary clutch engagement force regulation units in the above embodiment.

The duplex clutch control technique is applied to the twin clutch transmission system in which two parallel (separate) power transmission lines are equipped with two respective start clutches CA and CB in the above embodiment, but can be also applied to any other type of automated manual transmission system having three or more parallel (separate) power transmission lines equipped with respective start clutches and gears to perform shift operations with gear selection and clutch changeover.

The scope of the invention is defined with reference to the following claims.

What is claimed is:

1. A shift control device for an automated manual transmission in an automotive vehicle, the transmission having a plurality of power transmission lines equipped with respective start clutches and gears, the shift control device comprising:

a plurality of clutch actuation mechanisms that regulate clutch engagement forces to selectively engage and disengage the respective start clutches; and a transmission shift controller that causes the clutch actuation mechanisms to regulate the clutch engagement forces, respectively, so as to execute clutch changeover control for engaging one of the start clutches and disengaging any of the start clutches other than said one of the start clutches upon gear selection for a desired gear range in response to a transmission shift command, wherein each of the clutch actuation mechanisms has primary and secondary clutch engagement force regulation units operable independently; and the transmission shift controller outputs a control signal to the primary and secondary clutch engagement force regulation units of each of the clutch actuation mechanisms under the clutch changeover control so that either the primary or secondary clutch engagement force regulation unit of said each of the clutch actuation mechanisms becomes operated to regulate a corresponding one of the clutch engagement forces in accordance with the control signal.

2. The shift control device according to claim 1, the automated manual transmission being a twin clutch transmission having a first start clutch engaged for odd-numbered gear ranges and a second start clutch engaged for even-numbered gear ranges;

the clutch actuation mechanisms including first and second start clutch actuation mechanisms;

the secondary clutch engagement force regulation units of the first and second start clutch actuation mechanisms being source pressure regulator solenoids for adjusting a transmission line pressure to first and second source pressures, respectively;

the primary clutch engagement force regulation units of the first and second start clutch actuation mechanisms being clutch pressure regulator solenoids for adjusting the first and second source pressures to first and second clutch pressures applied to the first and second start clutches, respectively, for clutch engagement and disengagement; and the transmission shift controller being configured to output a pressure decrease signal to the clutch pressure and source pressure regulator solenoids of one of the first and second start clutch actuation mechanisms and outputs a pressure increase signal to the clutch pressure and source pressure regulator solenoids of the other of the first and second start clutch actuation mechanisms so as to operate either the clutch pressure or source pressure regulator solenoid of said one of the first and second start clutch actuation mechanisms and either the clutch pressure or source pressure regulator solenoid of said the other of the first and second start clutch actuation mechanisms in accordance with the pressure decrease and increase signals, respectively, under the clutch changeover control.

3. The shift control device according 2, further comprising:
a first group of shift actuators adapted to shift the gears for the odd-numbered gear ranges;
a second group of shift actuators adapted to shift the gears for the even-numbered gear ranges;
a first group of actuator control solenoids for generating, based on the second source pressure, hydraulic pressures to activate the first group of shift actuators, respectively; and
a second group of actuator control solenoids for generating, based on the first source pressure, hydraulic pressures to activate the second group of shift actuators, respectively.

4. The shift control device according to claim 2, wherein the transmission shift controller is configured to output the pressure decrease signal to the clutch pressure and source pressure regulator solenoids of one of the first and second start clutch actuation mechanisms and output the pressure increase signal to the clutch pressure and source pressure regulator solenoids of the other of the first and second clutch actuation mechanisms so as to operate either the clutch pressure or shift source pressure regulator solenoid of said one of the first and second start clutch actuation mechanisms and either the clutch pressure or source pressure regulator solenoid of said the other of the first and second clutch actuation mechanisms in accordance with the pressure decrease and increase signals, respectively, under the clutch changeover control when the transmission is placed in a manual shift mode.

5. The shift control device according to claim 2, wherein the transmission shift controller is configured to output the pressure decrease signal to the clutch pressure and source pressure regulator solenoids of the first start clutch actuation mechanism and outputs the pressure increase signal to the clutch pressure and source pressure regulator solenoids of the second clutch actuation mechanism so as to operate either the clutch pressure or source pressure regulator solenoid of the first start clutch actuation mechanism and either the clutch pressure or source pressure regulator solenoid of the second clutch actuation mechanism in accordance with the pressure decrease and increase signals, respectively, under the clutch changeover control when the vehicle is traveling at a speed lower than or equal to a given speed level at the time of upshifting from a first forward speed to a second forward speed.

6. The shift control device according to claim 2, wherein the transmission shift controller is configured to output the pressure decrease signal to the clutch pressure and source pressure regulator solenoids of the first clutch actuation mechanism and outputs the pressure increase signal to the clutch pressure and source pressure regulator solenoids of the second clutch actuation mechanism so as to operate either the clutch pressure or source pressure regulator solenoid of the first clutch actuation mechanism and either the clutch pressure or source pressure regulator solenoid of the second clutch actuation mechanism in accordance with the pressure decrease and increase signals, respectively, under the clutch changeover control when the vehicle is in a coasting state with no accelerator operation at the time of upshifting from a first forward speed to a second forward speed.

7. A shift control method for an automated manual transmission in an automotive vehicle, the transmission having a plurality of power transmission lines equipped with respective start clutches and gears, the shift control method comprising:
providing a plurality of clutch actuation mechanisms with primary and secondary clutch engagement force regulation units to regulate clutch engagement forces applied to selectively engage and disengage the respective start clutches; and
outputting a control signal to the primary and secondary clutch engagement force regulation units of each of the clutch actuation mechanisms so that either the primary or secondary clutch engagement force regulation unit of said each of the clutch actuation mechanisms becomes operated to regulate a corresponding one of the clutch engagement forces in accordance with the control signal in such a manner as to execute clutch changeover control for engaging one of the start clutches and disengaging any of the start clutches other than said one of the start clutches upon gear selection for a desired gear range in response to a transmission shift command.

8. A transmission system for an automotive vehicle, comprising:
an automated manual transmission having a plurality of power transmission lines equipped with respective start clutches and gears;
a plurality of clutch actuation mechanisms that regulate clutch engagement forces to selectively engage and disengage the respective start clutches; and
a transmission shift controller that causes the clutch actuation mechanisms to regulate the clutch engagement forces, respectively, so as to execute clutch changeover control for engaging one of the start clutches and disengaging any of the start clutches other than said one of the start clutches upon gear selection for a desired gear range in response to a transmission shift command,
wherein each of the clutch actuation mechanisms has primary and secondary clutch engagement force regulation units operable independently; and the transmission shift controller outputs a control signal to the primary and secondary clutch engagement force regulation units of each of the clutch actuation mechanisms under the clutch changeover control so that either the primary or secondary clutch engagement force regulation unit of said each of the clutch actuation mechanisms becomes operated to regulate a corresponding one of the clutch engagement forces in accordance with the control signal.

9. The transmission system according to claim 8, wherein the clutch engagement force is regulated by the primary clutch engagement force regulation unit when both of the primary and secondary clutch engagement force regulation units function normally and is regulated by the secondary clutch engagement force regulation unit in the event of a failure in the primary clutch engagement force regulation unit.

10. The transmission system according to claim 8, wherein the control signal is outputted to the primary and secondary clutch engagement force regulation units of each of the clutch actuation mechanisms under the clutch changeover control when a predetermined condition is satisfied and is outputted to the primary clutch engagement force regulation unit of each of the clutch actuation mechanisms when the predetermined condition is unsatisfied.

* * * * *